J. H. HILL.
METHOD OF MAKING TIRES.
APPLICATION FILED SEPT. 8, 1911.

1,141,708.  Patented June 1, 1915.

Witnesses:
Edmund O. Dubocq.
Helen C. Egan.

Joseph H. Hill, Inventor
By his Attorneys
Edwards, Sager & Wooster.

UNITED STATES PATENT OFFICE.

JOSEPH H. HILL, OF WILMINGTON, DELAWARE.

METHOD OF MAKING TIRES.

1,141,708.

Specification of Letters Patent.

Patented June 1, 1915.

Application filed September 8, 1911. Serial No. 648,390.

*To all whom it may concern:*

Be it known that I, JOSEPH H. HILL, a citizen of the United States, residing at Wilmington, in the county of New Castle and State of Delaware, have invented certain new and useful Improvements in Methods of Making Tires, of which the following is a full, clear, and exact specification.

This invention relates to method of making tires, the object being to provide a tire of great strength and ability to resist puncture, at a low cost of manufacture.

The tire consists of a hollow tubular core of yielding or elastic material, such a rubber, having an inflating tube or nozzle and covered with multiple layers of rubber and braiding, the whole being vulcanized under internal pressure sufficient to force the rubber between the interstices of the braided fabric to form a homogeneous tubular structure of great strength.

Tires have been made heretofore by forming multiple layers of rubber and winding between strips of canvas or cotton duck and subsequently vulcanizing; such a product differs radically from mine in that I provide for a seamless uncut mesh braided in consecutive steps about the several layers of the tire which secures perfect uniformity of texture of the ultimate product.

My invention will be better understood in connection with the accompanying drawings in which—

Figure 1:
Figure 2:
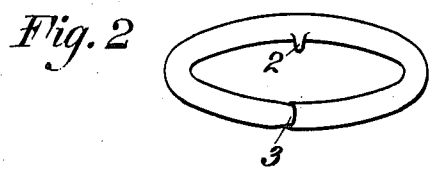
Figure 3:
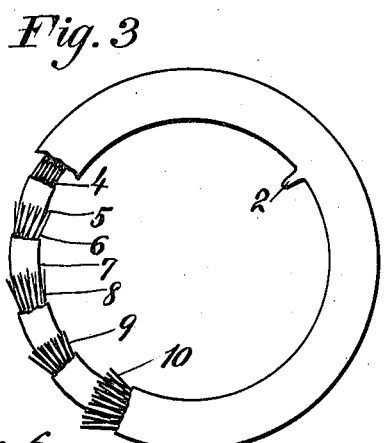
Figure 5:
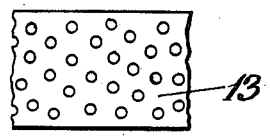
Figures 4, 6:
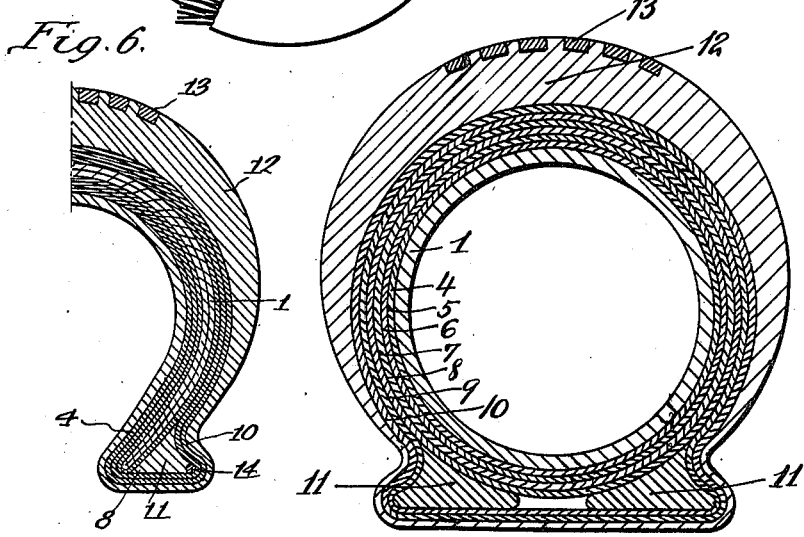

Figure 1 illustrates a tube of unvulcanized rubber from which the core or lining is made; Fig. 2 a hollow ring formed of such tube in which, at a suitable point, the teat or nozzle is drawn to form the means for inflating the tire when finally completed; Fig. 3 illustrates the mode of building up the tire with alternate layers of rubber and braiding; and Fig. 4 shows a section of a completed tire; Fig. 5 shows a reinforce. Fig. 6 shows a shoe made according to the method of this invention.

My invention is carried out by forming in desired lengths, by squirting, butt or lap welding, or any other approved process, a length of air tight tubing from rubber compound prepared for vulcanization of appropriate size to constitute the hollow core of the final product, as shown in Fig. 1. I cut off a proper length and coil it into circular form, inserting one end within the other, the joined parts being cemented together as indicated in Fig. 2. Before cementing the joint, I introduce a suitable quantity of ammonia or other gas forming substance, which will produce sufficient pressure under the heat of vulcanization to inflate the tube into contact with the walls of the mold, and draw out at a central point a teat, 2, from the unvulcanized compound of sufficient length to form a nipple to receive a valve for inflating the tire. After joining and cementing the ends, the hollow core 3 forms an annular ring, as shown in Fig. 2. It is then placed in a mold and sufficient heat applied to effect partial vulcanization while partially expanded. I then braid consecutive layers on the annular core, of textile material, such as cotton, separated by layers of rubber as indicated at 4, 5, 6, 7, 8, Fig. 3. This may be applied in any desired manner but is preferably carried out in a braiding machine by which a tubular layer of braid is applied around the partially inflated core, and simultaneously a thin strip of rubber is wound about the braiding. As many layers as desired of rubber and braid may be applied, each braided covering forming a seamless fabric inclosing the rubber in a strong openwork mesh, each strand completely surrounding the tube and making a stronger, more uniform fabric than canvas strips or any similar construction. While the layers of braiding are separate one from the other because of the interposed layers of rubber, the braiding is itself continuous, as is also the interposed rubber. This can easily be effected in a braiding machine specially constructed to open to permit removal of the finished tire before final vulcanization. The partially inflated annular inner tube having been inserted in the machine, as the braiding is applied, the tube is revolved. The rubber is applied on the braiding, and thus as many layers of continuous rubber and braiding will be applied, as the tube is given revolutions. After four or five alternate layers of the rubber and braid have been continuously built up on the tube, I may apply one or more protecting braidings of fine wire, 9, 10, preferably copper wire. Before applying these last two layers of braid, whether of cotton, wire or other material, two strips of rubber 11 (reinforced if desired) of the required thickness to produce a clencher beading, or other form of base to seat on the rim are placed in proper position on the inner periphery and then the final tubular coverings of braid are applied. A final layer of rubber is then applied and it is covered with a thick sheet of rubber which will constitute the tread when in service. The tire is then placed in a suitably shaped mold having a cross section such as in Fig. 4, and vulcanized under full heat and heavy pressure supplied through the valve. The pressure and heat when first applied cause the rubber to flow and impregnate the meshes of the braiding and to fill the sinuosities of the mold giving the base, 11, the proper outline to fit a wheel rim and giving the tread, 12, a gradually increasing thickness toward the line of contact with the road.

If desired, there may be embedded in the mass of rubber which reinforces the tread of the tire prior to vulcanization perforated rings or strips of leather, 13, Fig. 5, through the holes of which rubber will be forced by pressure, the leather strip constituting an additional safeguard against puncture, and skidding. Or such strips may be placed in the mold in the final step, in which case a tough armor of leather will be anchored in the tread flush with its surface. The method of this invention is not confined to the manufacture of what is known as a single tube tire, since a casing or shoe for a double tube tire can be made in an equivalent manner, it simply being necessary to change the molds to crescent form, so as to impart to the braided tubing and rubber a crescent instead of annular cross section when completed. Fig. 6 shows this form wherein the inflatable tube 1, is joined at the ends as before, then covered with a layer of braiding, as 4, then the tension wires 14 and beading strip 11 provided, between the braidings 4, and 6, then additional braidings as 8, 9, with interposed soft rubber as before, until the requisite thickness is built up. The core is then deflated and the tire shoe molded by compression and heat to vulcanize the whole together. The inner mold will of course be outwardly convex so as to bend the segment which is to be the interior half of the tire within the outer portion around the wires 14 and the beading strip 11. Even if the beading strip 11 and wires 14 be not used, the same method can be carried out and a shoe formed wherein the braidings will not have to be cut to remove the mold core, it being seen that in the case of a single tube tire the gas pressure compresses the tire in the mold, and in the case of a crescent-shaped shoe the usual interior mold inserted between the edges is used. Also, of course, the tread, as well as the rim flanges will be symmetrically placed relatively to the center. In like or well known manner, the tension wires for the sides can be braided in, and the inside and outside suitably finished for use. Such a tire, by reason of its braided structure, wherein the threads of each layer run spirally in opposite directions, will, when expanded by air pressure, have a strong tendency to contract in diameter and tightly grip the rim. Also, the braiding will itself tend to become more dense as the internal pressure increases, thus tending to resist puncture more effectively than heretofore in tires made up of layers of woven material.

Having thus described my invention, I declare that what I claim as new and desire to secure by Letters Patent, is:

1. The method of making a tire structure consisting in forming and inflating an annular tubular rubber core, covering the inflated core with overlying concentric tubes of continuous braided fabric, and interposing rubber between said layers, and completing the tire by molding and vulcanization while maintaining the continuity of said braiding.

2. The method of making a beaded tire consisting in forming and inflating an annular tubular rubber core, covering the inflated core with overlying concentric layers of continuous braided fabric alternating with rubber, applying a tread, beading strip, and tension wires thereto, and completing the tire by molding and vulcanization while maintaining the continuity of said braiding.

3. The method of making a beaded tire, consisting in forming and inflating an annular tubular rubber core, covering the inflated core with overlying concentric layers of continuous braided fabric alternating with rubber, applying tension wires between certain of said layers of braided fabric, and a tread and beading externally thereof and completing the tire ready for use while maintaining the continuity of said fabric by molding and vulcanization.

4. The method of making a tire structure consisting in forming and inflating an annular tubular rubber core, covering the inflated core with overlying concentric tubes of continuous braided fabric, interposing rubber between said layers, and completing the tire by molding and vulcanization while maintaining the inflation and the continuity of said braiding.

In testimony whereof I affix my signature, in presence of two witnesses.

JOSEPH H. HILL.

Witnesses:
H. C. MAHAFFY, Jr.,
J. W. MITCHELL.